United States Patent [19]

Kunesh et al.

[11] Patent Number: 5,215,734
[45] Date of Patent: Jun. 1, 1993

[54] RHOMBOHEDRAL CALCIUM CARBONATE AND ACCELERATED HEAT-AGING PROCESS FOR THE PRODUCTION THEREOF

[75] Inventors: Charles J. Kunesh, Bethlehem, Pa.; June D. Passaretti, Liberty Corner, N.J.

[73] Assignee: Pfizer Inc, New York, N.Y.

[21] Appl. No.: 901,440

[22] Filed: Jun. 19, 1992

Related U.S. Application Data

[62] Division of Ser. No. 493,075, Mar. 13, 1990.

[51] Int. Cl.$^5$ .......................... C09C 1/02; C01F 5/24; D21H 17/64
[52] U.S. Cl. ..................... 423/430; 106/464; 162/181.2
[58] Field of Search ............ 423/430, 431, 432; 106/464, 465; 162/181.2

[56] References Cited

U.S. PATENT DOCUMENTS 3,126,253 3/1964 Podschus ........................ 423/430
4,420,341 12/1983 Ferrigno ......................... 106/465
5,043,017 8/1991 Passaretti ....................... 106/465

Primary Examiner—Gary P. Straub
Attorney, Agent, or Firm—Peter C. Richardson; Lawrence C. Akers; Howard R. Jaeger

[57] ABSTRACT

A form of calcium carbonate having a blocky rhombohedral crystal structure and properties including a surface area of from about 3 to about 15 $m^2/g$, an average discrete particle size of from about 0.2 to about 0.9 micron, wherein the discrete particles have an aspect ratio less than about 2:1, and a particle size distribution such that at least about 60 weight percent of the particles have a size within 50 percent of the equivalent discrete particle spherical diameter, suitable for use as a filler material in papermaking to improve the optical properties of the resulting paper, is disclosed. An accelerated heat-aging process, including embodiments thereof which utilize hydrothermal techniques, for rapidly producing this form of calcium carbonate, and a related form of calcium carbonate having a hexagonal prismatic crystal structure and the same properties, in large quantities to meet the demand of the papermaking industry, as well as a method for using these materials in papermaking, are also disclosed.

4 Claims, 19 Drawing Sheets

RHOMBOHEDRAL CALCIUM CARBONATE AND ACCELERATED HEAT-AGING PROCESS FOR THE PRODUCTION THEREOF

This is a division, of application Ser. No. 493,075, filed on Mar. 13, 1990, now abandoned.

FIELD OF THE INVENTION

This invention relates to calcium carbonate having a specified crystal morphology, average particle size, particle size distribution and surface area, a process for producing this form of calcium carbonate product, and a method of use of the product as a filler material, for example, in papermaking, to improve the optical properties of the resulting paper.

BACKGROUND OF THE INVENTION

The present trend in papermaking is toward the manufacture of sheets with higher brightness and opacity. This type of paper is now made mostly through the use of extenders such as calcined clay and titanium dioxide. These materials present a number of disadvantages, however, in that they are rather expensive and unavailable in sufficient supply to satisfy the needs of large scale paper manufacturers. The competition for the limited quantities available further causes the price of these materials to remain high or to further increase. Consequently, their use is effectively limited to high grade, expensive papers which are usually produced in more limited quantities.

The papermaking industry has been clamoring for the development of a filler-extender material which is inexpensive, available in large quantities and which provides the desired properties in the final paper.

Precipitated calcium carbonate has been used as a filler material in paper for many years. Precipitated calcium carbonate has the advantage of being able to be produced in large quantity at relatively low cost. Therefore, it was decided to develop a form of precipitated calcium carbonate having a morphology which when used as a filler or extender in paper, affords the high level of brightness and opacity in the final paper product comparable to that achieved with the more expensive calcined clay and titanium dioxide filled papers.

One method of altering the morphology of a crystalline substance, such as precipitated calcium carbonate, in order to change its properties, is by Ostwald ripening or heat-aging.

Conventional heat-aging, also known as Ostwald ripening, is a process whereby crystals, such as of calcium carbonate, initially at a higher internal energy state, and having a relatively small average particle size and relatively high phase solubilities, undergo a phase transformation by dissolving and redepositing on crystals at a lower internal energy state. The process results in a final crystal product characterized by greater perfection of its crystal lattice structure, a narrower particle size distribution, greater degree of particle discreteness and lower surface energy.

The procedure for conventional heat-aging of precipitated calcium carbonate produced by the reaction of calcium hydroxide and carbon dioxide is to endpoint the precipitated calcium carbonate synthesis at pH 8.0, screen the material to remove the impurities, and heat a 10% by weight solids slurry to the aging temperature (usually 80° C.). The pH of the system rises to approximately 10.5 due to the unreacted $Ca(OH)_2$ in the slurry.

The aging reaction can be monitored by measuring the surface area of the calcium carbonate at hourly intervals.

Unfortunately, conventional heat-aging is a slow, time consuming and highly capital intensive process. Heat-aging of calcium carbonate with an initial morphology having a higher surface area and smaller average particle size to a final morphology having a surface area of from about 3 to about 15 $m^2/g$ and an average discrete particle size of from about 0.2 to about 0.9 microns typically takes extended periods of time ranging up to several hundred hours, depending in part on the degree of purity of the starting material and the aging temperature. The time required for heat-aging is inversely dependent on the purity of the starting material, the purer the material, the shorter the aging time required. Calcium carbonates containing impurities such as magnesium carbonate, at levels as low as several weight percent, require considerably longer heat-aging time to rearrange their morphologies. The time required for heat-aging is also inversely dependent on the aging temperature; a longer time is required at lower temperatures, and a shorter time is required at higher temperatures. In order to produce commercial scale quantities of product obtained by the conventional heat-aging process, large equipment volumes are needed, thus making this process uneconomical.

SUMMARY OF THE INVENTION

The primary objective of the present invention is a high opacifying, high brightness material that is applicable at a paper machine's wet end, size press, or coating stage and is competitive with current expensive fillers such as calcined clay and titanium dioxide, and a process for the rapid, cost effective production of such material in large quantity.

Heat-aged calcium carbonate of rhombohedral morphology, having a surface area of from about 3 to about 15 $m^2/g$, an average discrete particle size of from about 0.2 to about 0.9 microns, wherein the discrete particles have an aspect ratio less than 2, and a particle size distribution such that at least about 60 weight percent of the particles lie within 50 percent of the equivalent discrete particle averge spherical diameter, when utilized as a filler in the manufacture of paper, results in a paper product that demonstrates a significant improvement in performance with respect to the optical properties of the paper over any previously made paper utilizing other forms of calcium carbonate as the filler material.

In order to meet the demand for large quantities of heat-aged calcium carbonate having these properties, it was desired to determine a way to significantly shorten the amount of time required for heat-aging. Accordingly, this invention teaches an accelerated process for heat-aging which is particularly adapted to producing large amounts of heat-aged calcium carbonate having properties which make it an unexpectedly superior filler material in papermaking. The product produced by the accelerated heat-aging process of the present invention is also useful as a filler for rubber, plastics, paint, food products, synthetic resins and the like.

The accelerated heat-aging process of the present invention involves the adjustment of the pH of the calcium carbonate at the aging temperature to about 6.5, followed by the addition of an alkali metal hydroxide, preferably sodium hydroxide, to the calcium carbonate, to raise the pH to from about 9.5 to about 12.0.

DETAILED DESCRIPTION OF PREFERRED EMBODIMENTS

Figure 1:
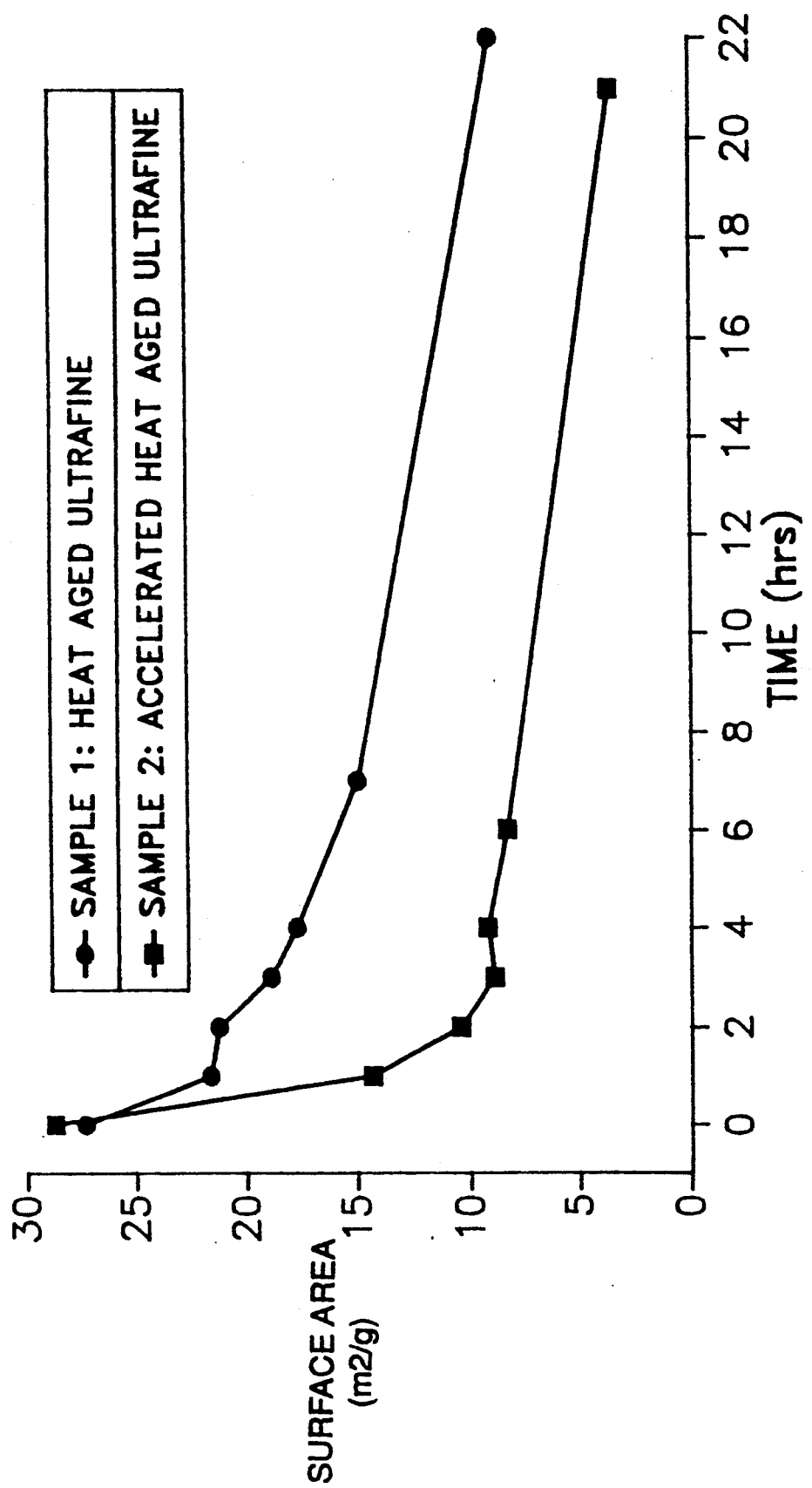
FIG. 1 shows the specific surface area over time of samples of ultrafine precipitated calcium carbonate prepared according to both the accelerated heat-aging process and the conventional heat-aging process.

While not wishing to be limited to a particular theory to explain the basis for the significant improvement in the time required for heat-aging according to the present process, we believe that the reduction in heat-aging time is attributable to the presence of a high concentration of hydroxide ions produced by the dissociation of the alkali metal hydroxide added to raise the pH. The hydroxide ions supplied by the dissociated alkali metal hydroxide act to suppress the phenomenon, known to those skilled in the art as "flashback". Flashback is the dissociation of calcium hydroxide, which is entrained in all forms of calcium carbonate at some level of concentration, even in high purity calcium carbonate. Calcium ions produced by the dissociation of calcium hydroxide are responsible for interfering with and inhibiting the rate of the conventional calcium carbonate heat-aging recrystallization process, thereby causing the lengthy time required for conventional heat-aging. The calcium ions prevent the dissociation of calcium carbonate which in turn hinders the recrystallization phase of the heat-aging process. In the accelerated heat-aging process of the present invention, the presence of the high concentration of hydroxide ions supplied by the dissociating alkali metal hydroxide added to the calcium carbonate causes an equilibrium shift in the reverse direction to suppress dissociation of the entrained calcium hydroxide in the calcium carbonate, resulting in a more equal concentration of calcium and carbonate ions in the recrystallization mixture, which greatly speeds up the heat-aging recrystallization process.

According to the accelerated heat-aging process of the present invention, the crystal morphology of calcium carbonate is rearranged from an initial morphology having a surface area of greater than about 15 $m^2/g$ and an average discrete particle size of from about 0.01 to about 0.8 microns, to a final morphology having a surface area of from about 3 to about 15 $m^2/g$, and an average discrete particle size of from about 0.2 to about 0.9 microns.

As used herein, the terms "crystal habit" and "crystal structure" are interchangeable and refer to the basic crystal lattice of a unit cell crystal of the form of calcium carbonate under discussion; and the terms "morphology" and "properties" are interchangeable and refer to certain additional physical parameters of the form of calcium carbonate under discussion, on a macroscopic level, including, for example, specific surface area, particle size and particle size distribution.

As used herein, the term "hydrothermal" is defined as referring to a process wherein an aqueous slurry of calcium carbonate is heated to a temperature higher than the normal atmospheric boiling point of water at 100° C. (212° F.), typically in a bomb or other sealed vessel able to withstand elevated pressure, such that at the temperature to which the slurry in the vessel is heated, a resultant superatmospheric pressure is generated, which resultant pressure is a function of the temperature and concentration of the slurry, and which due to the boiling point elevation properties of the solid calcium carbonate of the slurry on the boiling point of pure water, will be different from the vapor pressure of pure water at the corresponding temperature.

As defined herein, average discrete particle size refers to the equivalent spherical diameter of an individual particle which can exist as an individual particle or as part of a cluster or agglomerate, as opposed to the equivalent spherical diameter of the cluster or agglomerate itself.

The process comprises the steps of initiating heat-aging of the calcium carbonate by heating it to an aging temperature of from about 40° to about 100° C.; adjusting the pH of the calcium carbonate at the aging temperature to about 6.5, such as by addition of carbon dioxide; adding an alkali metal hydroxide to the calcium carbonate at the aging temperature to raise the pH to from about 9.5 to about 12.0; maintaining the calcium carbonate at the aging temperature for a sufficient time to cause the morphology of the calcium carbonate to rearrange to the final form; and terminating heat-aging to fix the morphology of the calcium carbonate in the final form.

The process of the present invention can be applied to calcium carbonate either as precipitated calcium carbonate or as fine ground natural limestone.

The calcium carbonate can be in a form either as a dry powder, which is subsequently slurried, or as an aqueous slurry. When the calcium carbonate is used in the form of an aqueous slurry, it has been found that a slurry having about a 10 weight percent calcium carbonate solids content is preferred.

The alkali metal hydroxide can be a hydroxide of any metal from group IA of the periodic table. Sodium hydroxide is preferred. It has been found that calcium hydroxide is not effective for use in adjusting the pH of the calcium carbonate at the aging temperature. This is believed to be due to the presence of the calcium ions formed on dissociation of the calcium hydroxide inhibiting the dissolution of calcium carbonate, thus slowing the aging process.

The amount of alkali metal hydroxide added to the calcium carbonate is in an amount of from about 0.1 to about 15 weight percent, based on the dry weight of calcium carbonate. The alkali metal hydroxide added to adjust the pH can be pure or an aqueous alkali metal hydroxide solution. Sodium hydroxide is the preferred alkali metal hydroxide.

The length of time the calcium carbonate must be maintained at the aging temperature in order to recrystallize to the new morphology is determined by both the initial morphology of the calcium carbonate and the nature and extent of any impurities present in the calcium carbonate.

Where the calcium carbonate starting material has an initial average particle size of from about 0.01 to about 0.5 microns and has a high purity, the aging time is as short as about 60 minutes. For calcium carbonate starting material having a larger initial agglomerated particle size of from about 0.5 to about 2 microns, and/or containing impurities, particularly such as magnesium carbonate, of up to about 5 weight percent, the heat-aging time can be as long as 24 hours.

When the calcium carbonate has been heat-aged sufficiently long so that transformation of the calcium carbonate crystal morphology is complete, the heat-aging process must be terminated to fix the morphology in the desired state, and prevent further recrystallization.

Heat-aging can be terminated by either reducing the temperature to below about 40° C.; by reduction of the pH; or by a combination of temperature and pH reduction.

It has been found that heat-aging does not occur or proceeds at such a slow rate as to be insignificant when the temperature is reduced to about 40° C. or below. The heat-aging process is also very pH sensitive and a reduction of the pH to below about 8.5 effectively halts heat-aging and further recrystallization of the calcium carbonate.

Termination of heat-aging by temperature reduction can be effected rapidly by quenching the calcium carbonate, such as by immersion in an ice bath.

Termination of heat-aging by pH reduction is effected by addition of $CO_2$ or of a polybasic acid to the calcium carbonate. The polybasic acid is preferably phosphoric acid.

Calcium carbonate can also be heat-aged according to further embodiments of the process of the present invention which utilize hydrothermal techniques.

It has been found that heat-aging in a hydrothermal bomb under hydrothermal conditions of high temperature, up to about 300° C., and under elevated pressure, up to about 750 psi, causes an acceleration of the aging process and reduction in the required aging time from the time required for conventional heat-aging, and even a further reduction in aging time from the time required for non-hydrothermal accelerated heat-aging at conditions of lower temperature and ambient pressure.

Hydrothermal-aging alone, with no adjustment of the initial pH of the starting calcium carbonate, causes faster rearrangement of the calcium carbonate crystal morphology than under the initial pH-adjusted, lower temperature, ambient pressure accelerted heat-aging conditions of the other embodiment of the process of this invention.

It has been further found that the heat-aging crystal morphology rearrangement process is still further accelerated in another embodiment of the process of the present invention wherein heat-aging is initiated at a temperature of from about 40° to about 100° C., and the initial pH of the starting calcium carbonate is adjusted to about 6.5, followed by addition of an alkali metal hydroxide, preferably sodium hydroxide, to the calcium carbonate at the heat-aging temperature to raise the pH to from about 9.5 to about 12.0, as in the non-hydrothermal accelerated heat-aging process of the present invention, and the calcium carbonate is then hydrothermally-aged in a hydrothermal bomb under hydrothermal conditions in which the temperature of the bomb is raised to the hydrothermal temperature, of up to about 300° C., resulting in a bomb pressure of up to about 750 psi, at which conditions even more rapid rearrangement of the calcium carbonate crystal morphology occurs, resulting in an even shorter overall heat-aging time.

It has been found that the optical properties of paper, particularly brightness, are greatly improved by utilizing heat-aged calcium carbonate having a surface area of from about 3 to about 15 $m^2/g$, an average discrete particle size of from about 0.2 to about 0.9 microns, wherein the discrete particles have an aspect ratio less than 2, and a particle size distribution such that at least about 60 weight percent of the particles lie within 50 percent of the equivalent discrete particle averge spherical diameter, as a filler material during papermaking. While any heat-aged calcium carbonate having the desired physical properties is effective, that produced according to the accelerated heat-aging process and the hydrothermal-aging process of the present invention, is highly desirable in that it is fast and economical to produce on a large scale in the quantities required for papermaking.

EXAMPLES

The nature and scope of the present invention may be more fully understood in view of the following non-limiting examples.

All calcium carbonate referred to in the following examples was precipitated from lime produced at the Pfizer quarry in Adams, MA. All reactions were conducted on either a 4 or 30 liter scale.

EXAMPLE 1: Accelerated heat-aging

Typically, when precipitated calcium carbonate is made, the reaction is complete when the pH of the system reaches 8.0. After the endpoint, the pH of the system rises to approximately 9.5 due in part to the unreacted $Ca(OH)_2$ in the system. However, solubility product calculations done to determine the effect of $Ca(OH)_2$ on the solubilization and precipitation of calcium carbonate at elevated pH indicate that $Ca(OH)_2$ in solution retards the aging. Additionally, solubility product calculations also indicate that the optimum pH for aging calcium carbonate is 10.2–11.5 although aging occurs at other basic pH's.

Precipitated calcium carbonate having less than 0.1 micron particle size, referred to herein as "ultrafine", and a surface area of from about 25 to about 40 $m^2/g$, was endpointed at pH of 6.7 to eliminate as much $Ca(OH)_2$ as possible. The product was screened to eliminate impurities, and 2400g of the product in a 10% by weight slurry was heated to 80° C. At 80° C., the pH of the slurry was again brought down to 6.7 with carbon dioxide, and 48g of sodium hydroxide was added to the slurry (2% by weight) to bring the pH up to an optimum aging pH of 10.9–11.1. Within one hour, the viscosity increased approximately 40-fold. Samples were taken every hour for surface area determination. The aging reaction was observed to proceed at an accelerated rate. By this process, a product surface area in the range of 8 $m^2/g$ was achieved as compared to over 22 hours by a normal aging process. FIG. 1 shows the comparison between ultrafine that was aged by the accelerated process and a conventional aging process.

EXAMPLE 2: Uniqueness of particle morphology by accelerated heat-aging

Figure 2:
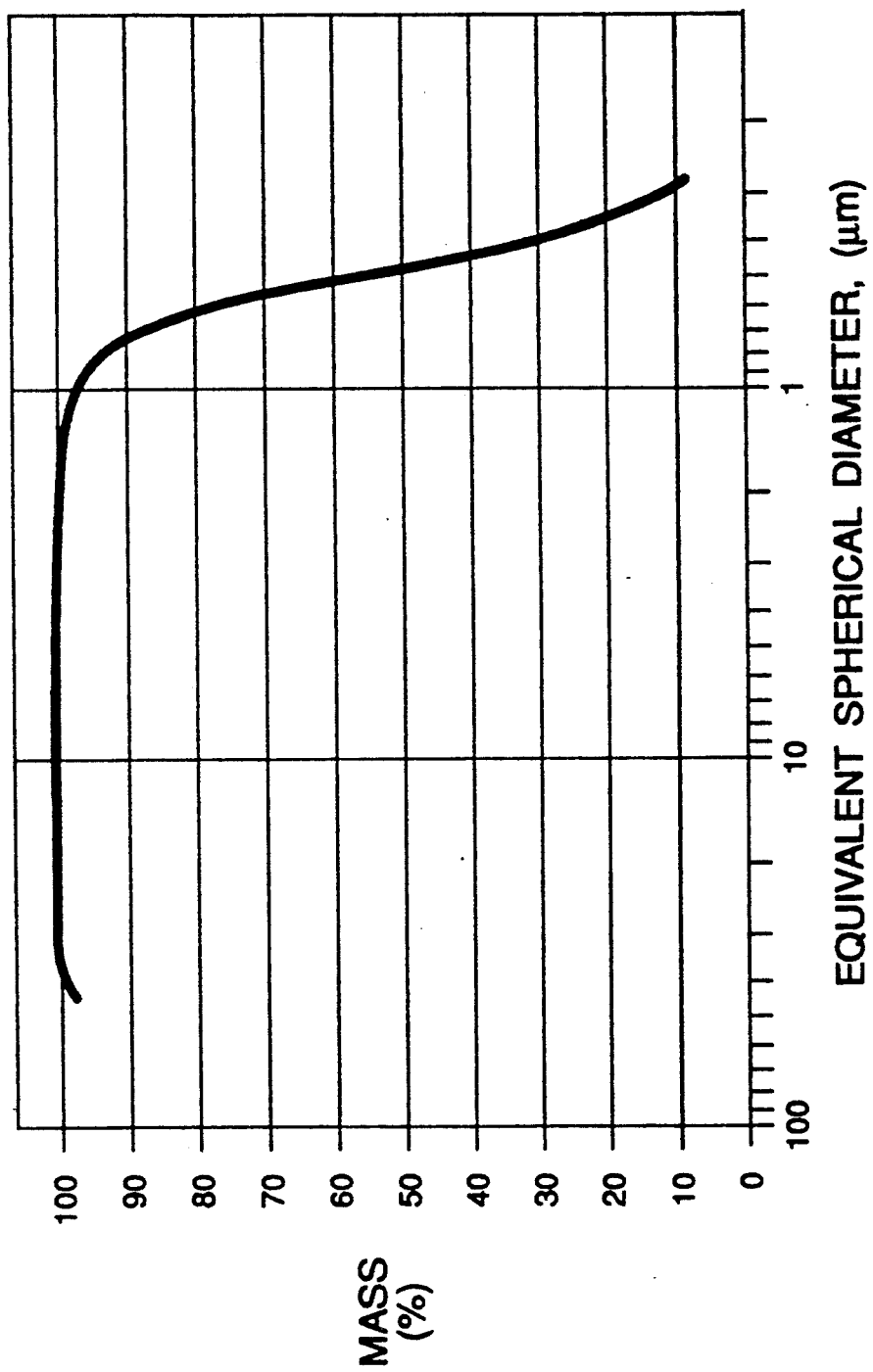
FIG. 2 is a particle size distribution curve of rhombohedral calcium carbonate showing the narrow size distribution.
Figure 3:
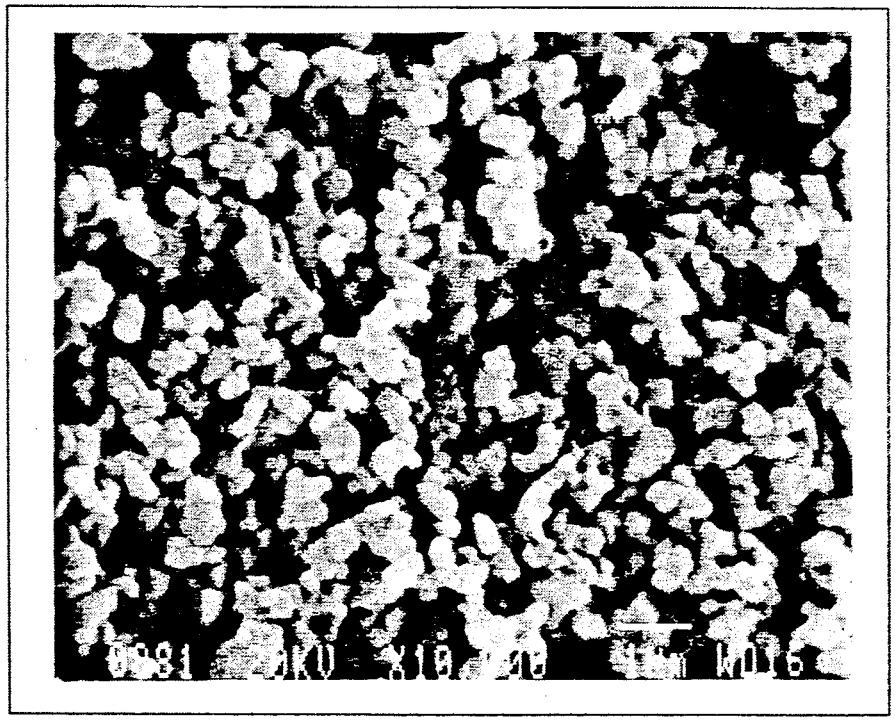
FIG. 3 is a photomicrograph of the crystal morphology of particles of precipitated calcium carbonate heat-aged by the accelerated heat-aging process.
Figure 4:
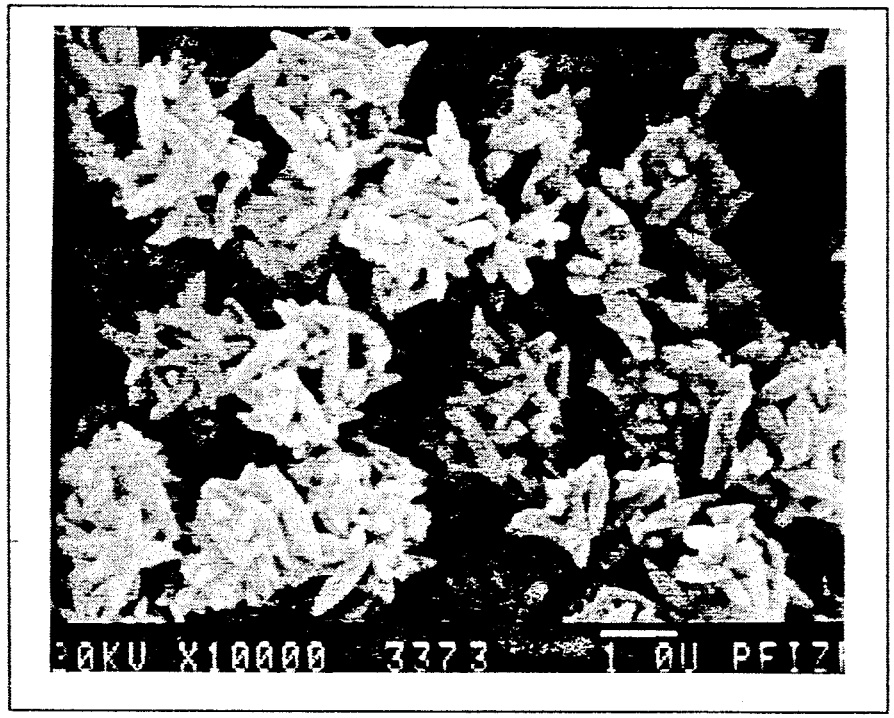
FIG. 4 is a photomicrograph of the industry standard non-heat-aged precipitated calcium carbonate having a scalenohedral rosette structure.

Fresh 30 liter batches of ultrafine precipitated calcium carbonate in which no additives were used during slaking, carbonation, or post-carbonation were aged by the accelerated heat-aging process described in Example 1. The aging temperature was 80° C. and the pH was 10.5. The aged products, with surface areas ranging from 18.2 to 7.4 $m^2/g$, were evaluated in hand sheets. The final particle morphology of ultrafine precipitated calcium carbonate particles was rhombohedral, with a final particle size of about 0.3–0.5 microns. The particle size distribution of this material, showing its narrow size distribution, wherein at least about 60 weight percent of the particles lie within 50 percent of the equivalent discrete particle average spherical diameter, is shown in FIG. 2. FIG. 3 is a photomicrograph of the crystal morphology of particles heat-aged by the accelerated heat-aging process of this invention. This figure should be compared to FIG. 4 which is a photomicrograph of the crystal morphology of non-heat-aged precipitated calcium carbonate having a scalenohedral rosette structure, which was heretofore the best known filler for achieving enhanced optical properties in paper.

Figure 5:
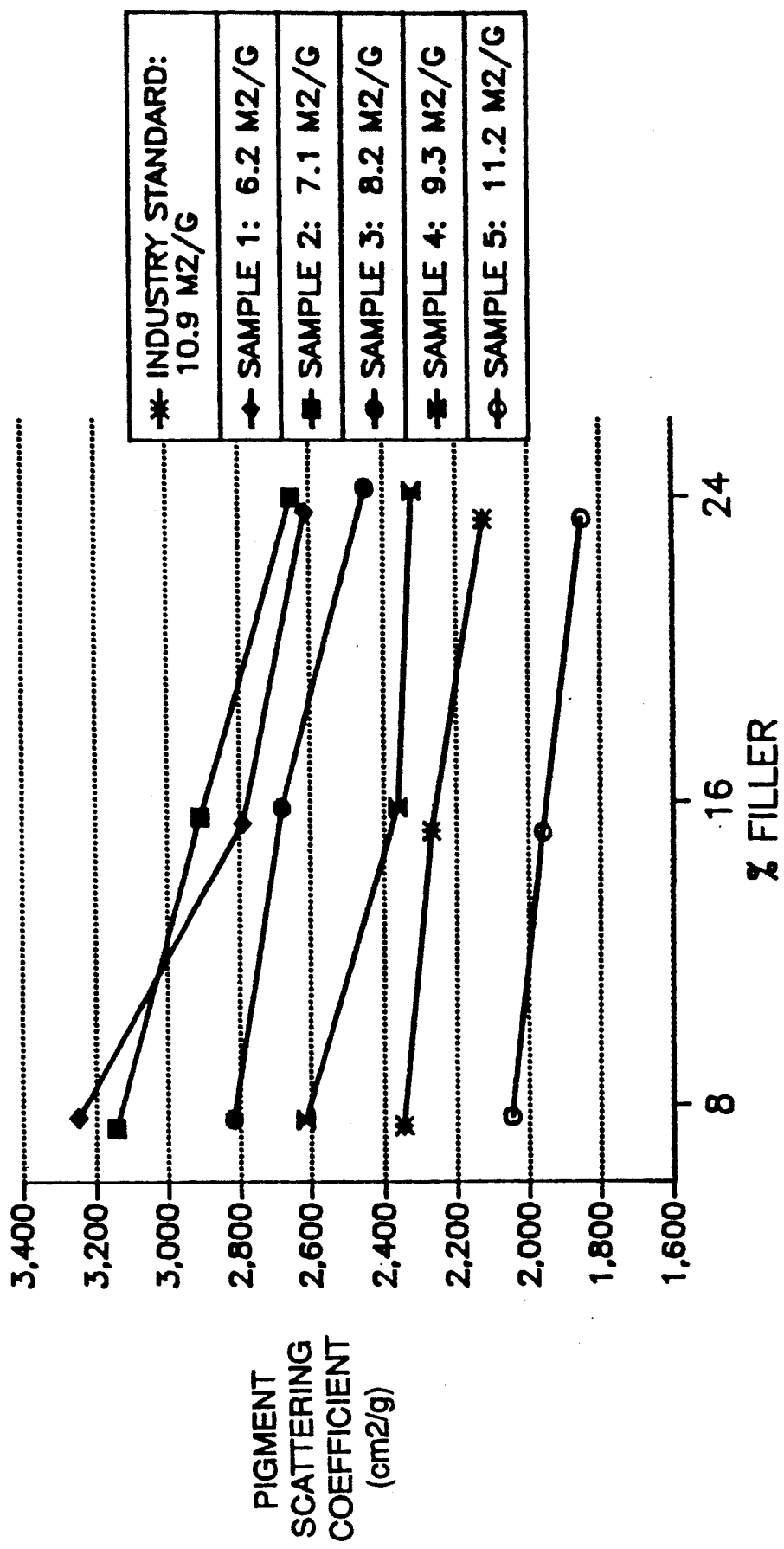
FIG. 5 is a comparison of pigment scattering coefficient in handsheets versus the percent filler content for various forms of heat-aged ultrafine precipitated calcium carbonate and non-heat-aged precipitated calcium carbonate fillers.
Figure 6:
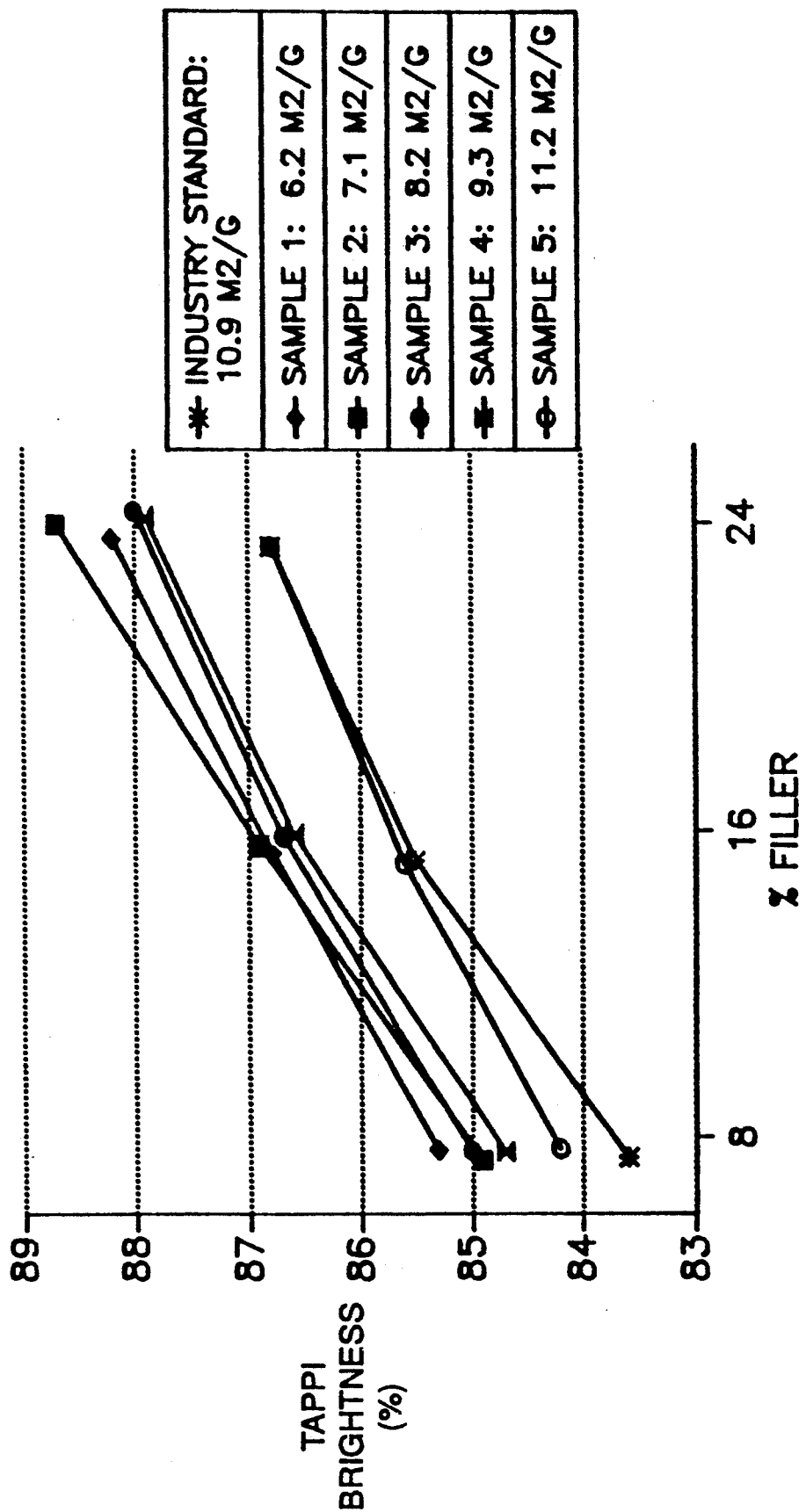
FIG. 6 is a comparison of brightness in handsheets versus the percent filler content for various forms of heat-aged ultrafine precipitated calcium carbonate and non-heat-aged precipitated calcium carbonate fillers.
Figure 7:
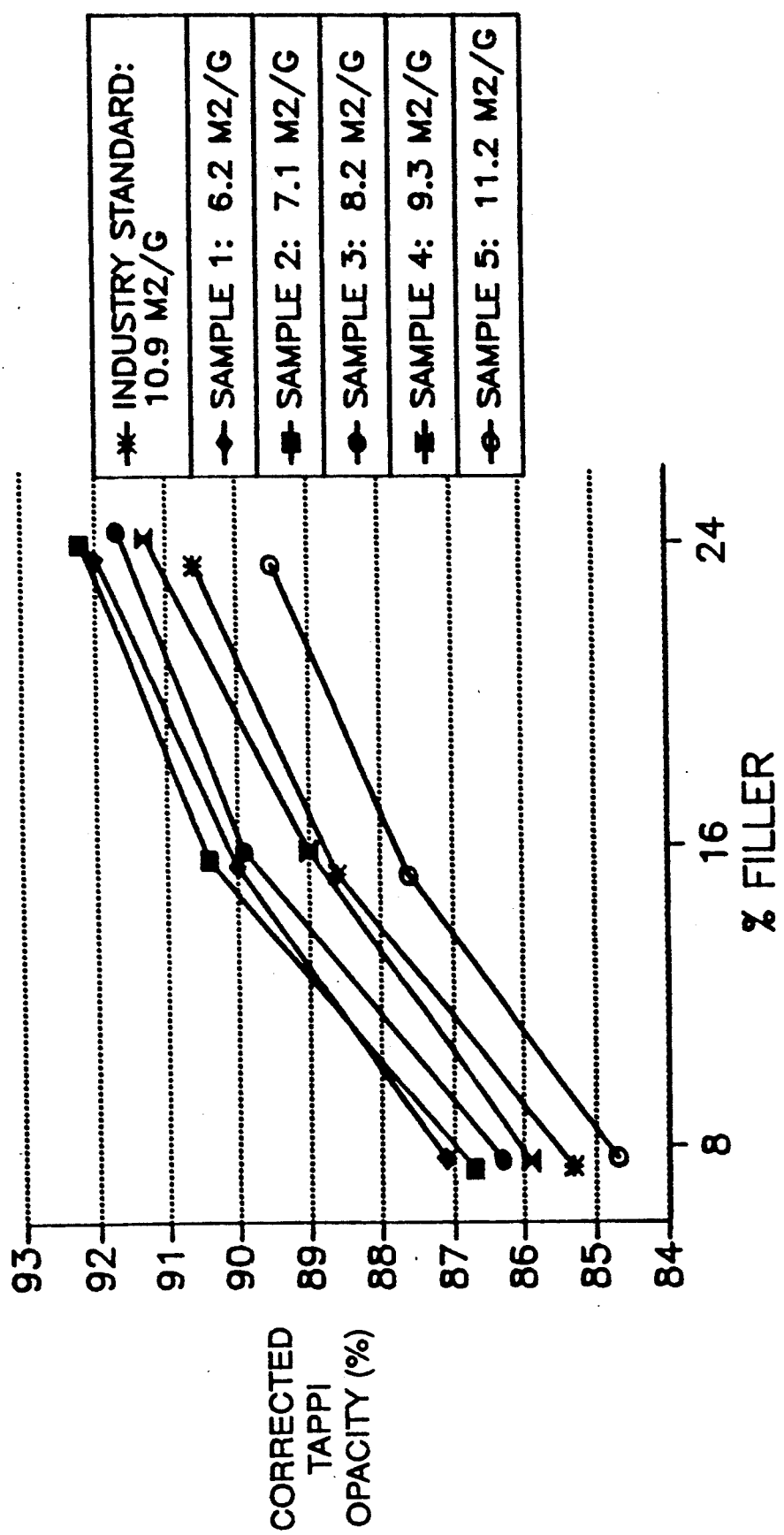
FIG. 7 is a comparison of handsheet opacity versus the percent filler content for various forms of heat-aged ultrafine precipitated calcium carbonate and non-heat-aged precipitated calcium carbonate fillers.
Figure 8:
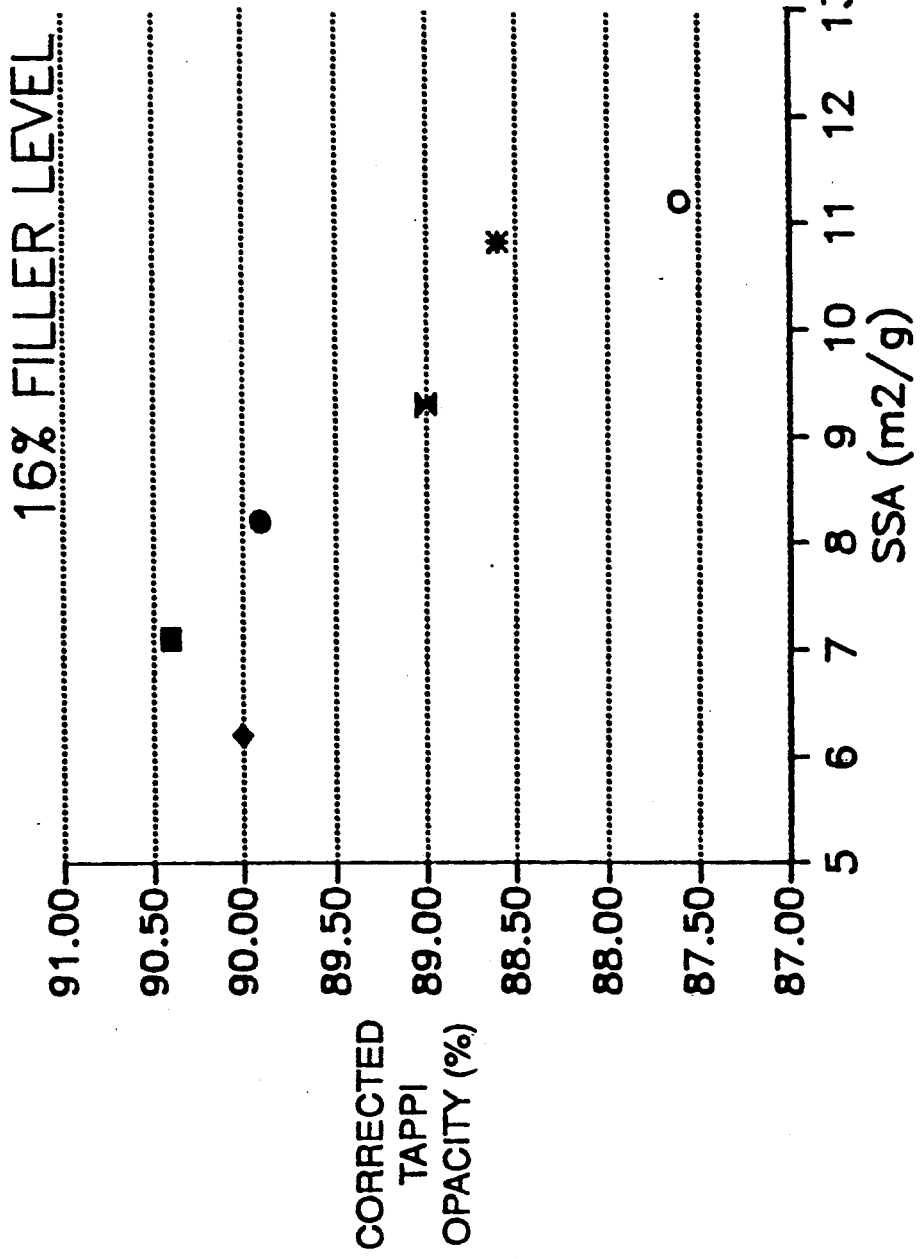
FIG. 8 shows handsheet opacity versus specific surface area for various heat-aged ultrafine precipitated calcium carbonate and non-heat-aged precipitated calcium carbonate fillers.
Figure 9:
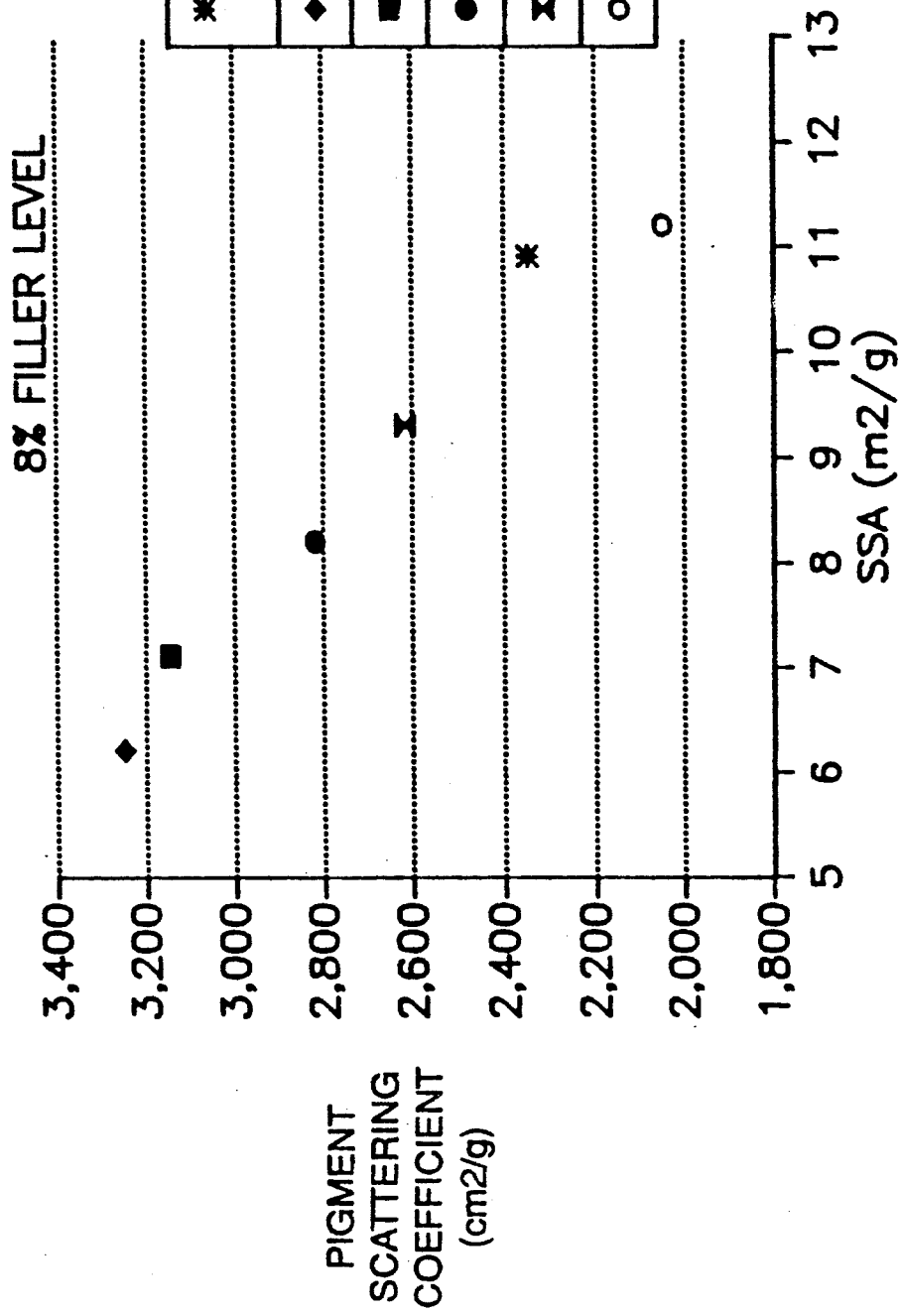
FIG. 9 shows pigment scattering coefficient versus specific surface area for various heat-aged ultrafine precipitated calcium carbonate and non-heat-aged precipitated calcium carbonate fillers.
Figure 10:
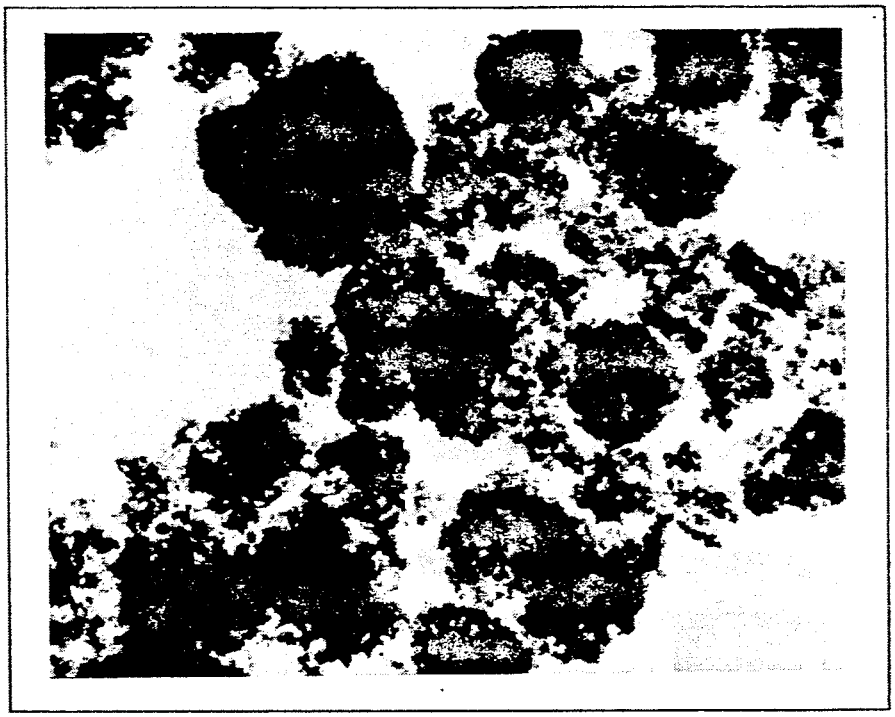
FIG. 10 is a transmission electron micrograph of non-heat-aged ultrafine precipitated calcium carbonate showing initial crystal morphology before heat-aging.
Figure 11:
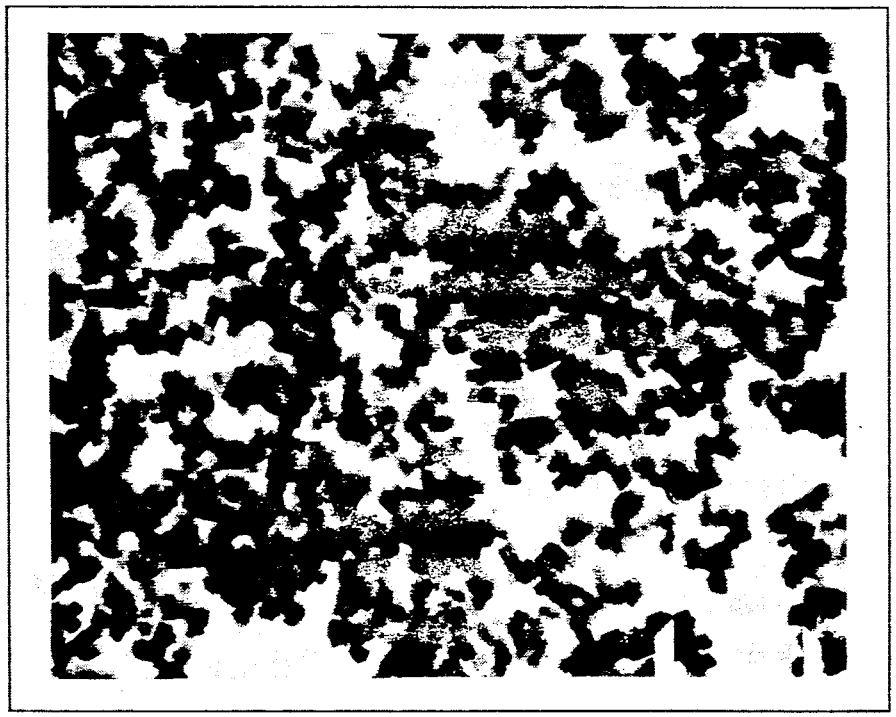
FIG. 11 is a transmission electron micrograph of heat-aged ultrafine precipitated calcium carbonate showing the rhombohedral morphology.
Figure 12:
FIG. 12 is a transmission electron micrograph of non-heat-aged scalenohedral precipitated calcium carbonate.
Figure 13:
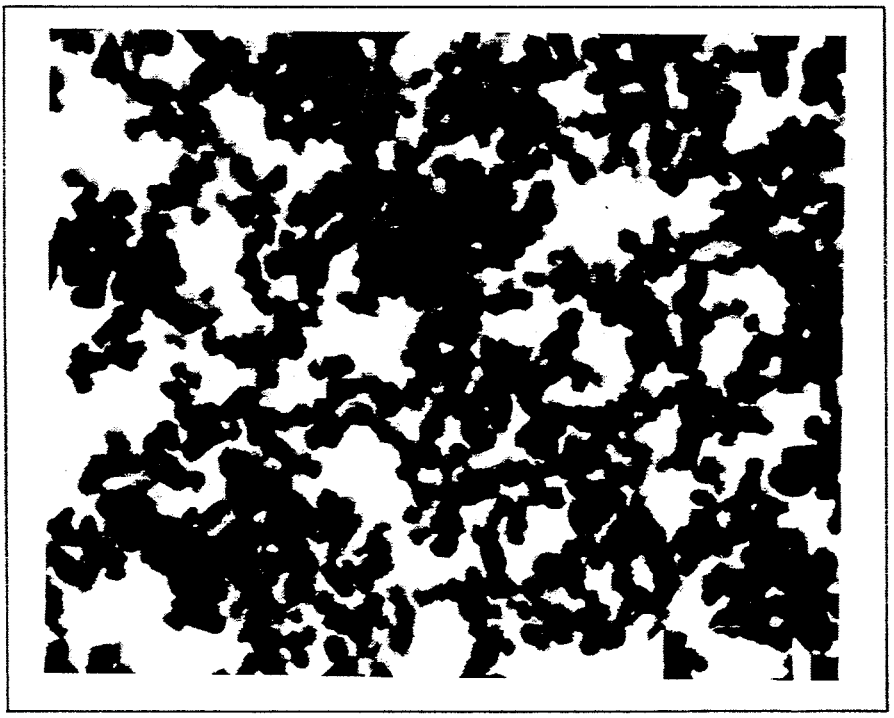
FIG. 13 is a transmission electron micrograph of heat-aged scalenohedral precipitated calcium carbonate showing the prismatic morphology.

The results of the hand sheet study indicated that the heat-aged products had superior optical properties than the industry's best non-heat-aged scalenohedral precipitated calcium carbonate. This is shown in FIGS. 5, 6, and 7. The study also indicated that for a heat-aged precipitated ultrafine calcium carbonate made from Adams, MA lime, the best surface area for optical performance is 10–5 $m^2/g$ as shown in FIGS. 8 and 9.

EXAMPLE 3: Comparison of particle morphologies for different precursors

Figure 14:
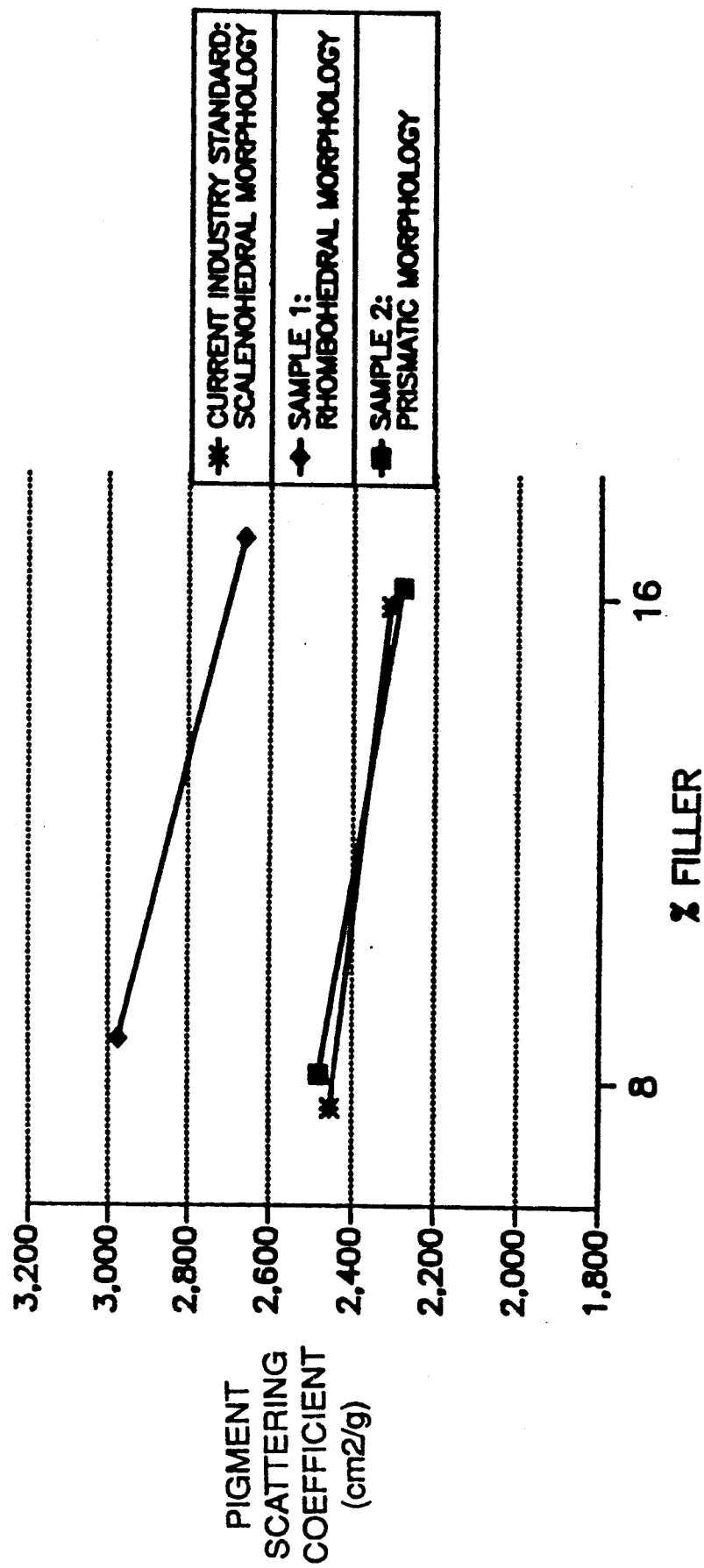
FIG. 14 shows pigment scattering coefficient versus percent filler content in handsheets for various forms of heat-aged precipitated calcium carbonate and non-heat-aged precipitated calcium carbonate fillers.
Figure 15:
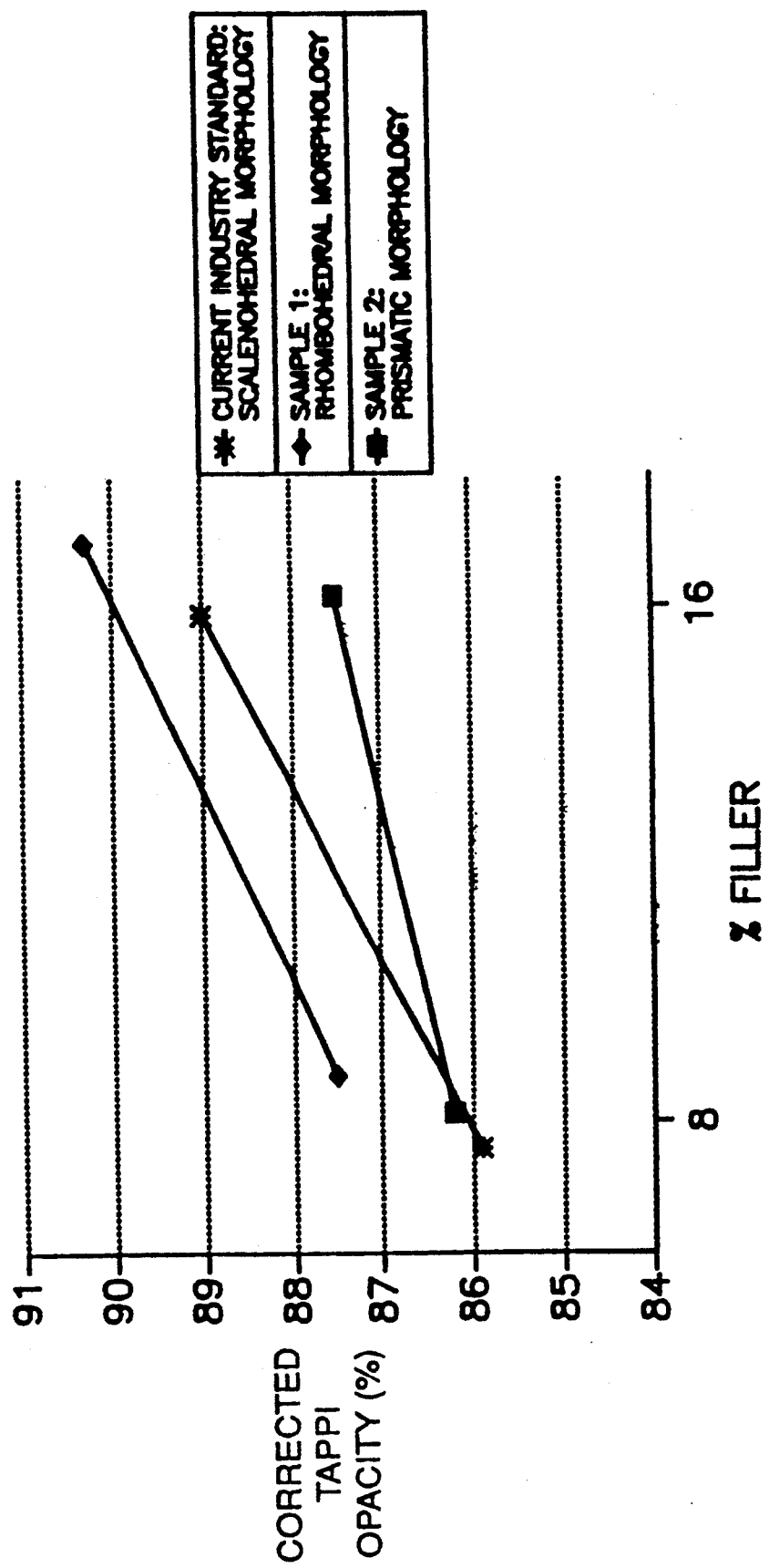
FIG. 15 shows opacity versus percent filler content in handsheets for various forms of heat-aged precipitated calcium carbonate and non-heat-aged precipitated calcium carbonate fillers.
Figure 16:
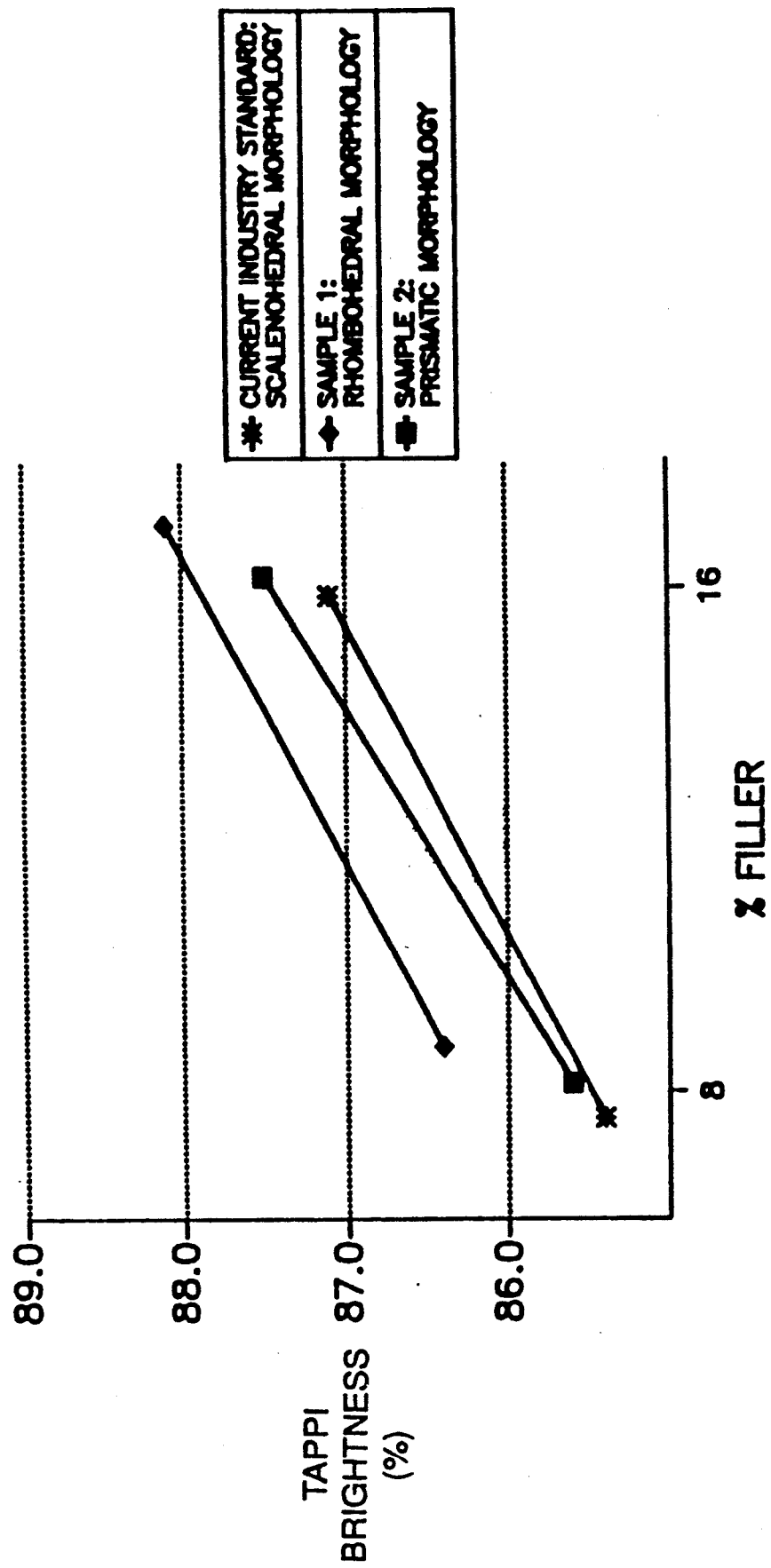
FIG. 16 shows brightness versus percent filler content in handsheets for various forms of heat-aged precipitated calcium carbonate and non-heat-aged precipitated calcium carbonate fillers.

Numerous materials such as ultrafine and scalenohedral precipitated calcium carbonates were heat-aged to surface areas between 8 and 12 $m^2/g$ with particle sizes of from about 0.40 to about 0.55 microns by the accelerated heat-aging process of Example 1. Table 1 lists the properties of the starting materials and the aged materials. Aging a precursor such as ultrafine resulted in a final product having a rhombohedral morphology. Aging a scalenohedral precursor resulted in a final product having a prismatic morphology. This can be clearly seen in FIGS. 10, 11, 12 and 13, which show the comparison between the precursors and the aged products. All the materials listed in Table 1 were evaluated in laboratory hand sheets. The results of the study indicated that even though the surface areas and particle sizes of the products were similar regardless of the precursor, the product morphology has a significant effect upon the optical properties of the particle. Rhombohedral particles exhibited superior optical properties over prismatic particles. The optical performance of the prismatic particles was comparable to or lower than that of the current industry standard scalenohedral calcium carbonate. However, in all cases, aging improved brightness. The results of the handsheet study are shown in FIGS. 14, 15, and 16.

EXAMPLE 4: Optimum accelerated heat-aging temperature

Figure 17:
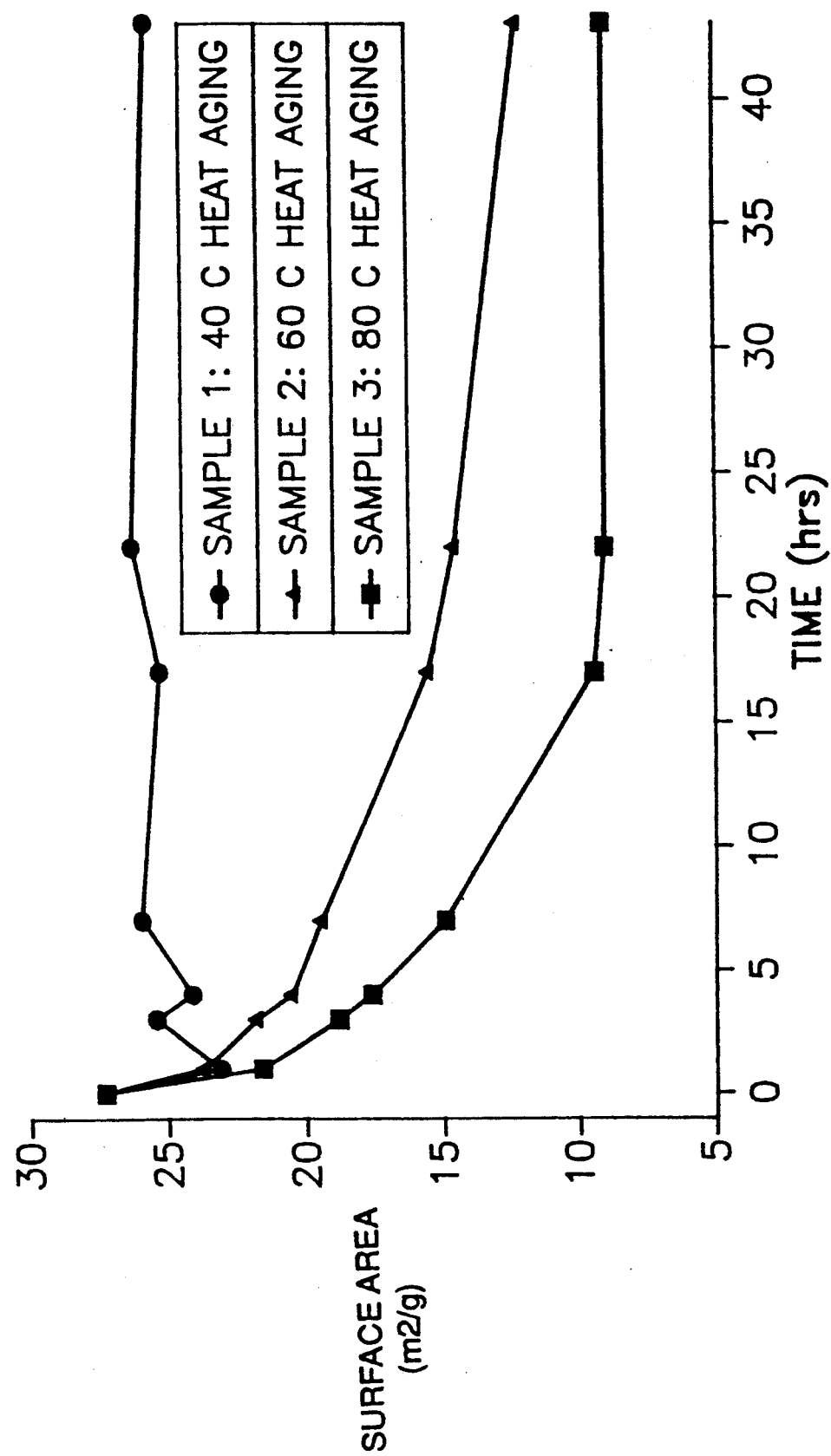
FIG. 17 shows specific surface area versus time for various heat-aged ultrafines, heat-aged at various temperatures.

Three different heat-aging temperatures 40°, 60°, and 80° C. were compared to determine the effect of temperature on the heat-aging rate of calcium carbonate. The pH of the aging reaction was 10.5. As was expected, the rate of aging, as determined by the surface area of the aged material, was positively correlated with the aging temperature; that is, the rate of aging was faster at a higher aging temperature. The sample that was aged at 60° C. aged similarly to the sample aged at 80° C., with respect to the final surface area of the product, except that the reaction lagged approximately 10–15 hours behind the 80° C. reaction. The surface area of the products from the 40° C. aging did not change significantly even after 45 hours of aging. The surface area of heat-aged ultrafine versus the heat-aging time for each of the three temperatures is shown in FIG. 17.

EXAMPLE 5: Hydrothermal processing

Since the aging reaction proceeds faster at high temperature, it was assumed that a sample that is aged hydrothermally attains a low surface area at a much faster rate than a sample that is aged at 80° C. at ambient pressure.

A batch of ultrafine precipitated calcium carbonate (surface area 38 $m^2/g$) was synthesized without additives and endpointed at pH 8.0. A sample of this material was slurried to a 10% by weight solids content and 1800 ml of the slurry was placed into a 4 liter PARR hydrothermal bomb. The temperature was raised to 200° C. within one hour, and the resulting pressure was 500 psi. at 500 psi. The temperature was held at 200° C. for one hour and cooled for a total aging time of 2.5 hours. The surface area of the product was 15.7 m$^2$/g, which would have taken 7 hours to attain under conventional heat-aging conditions.

EXAMPLE 6: Hydrothermal-aging via accelerated aging process

Figure 18:
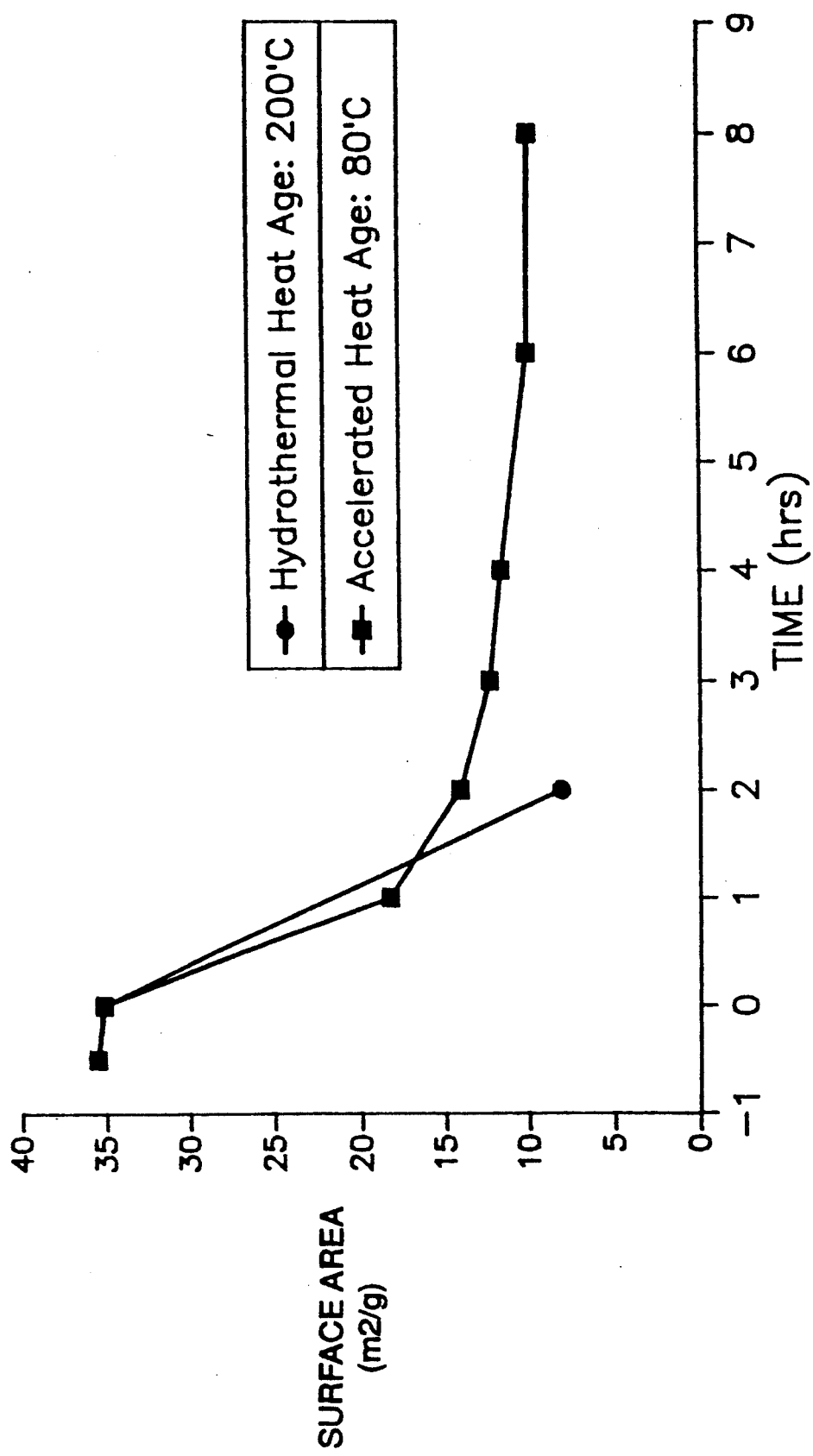
FIG. 18 shows a comparison of the aging rates between 80° C. and 200° C. for the accelerated heat-aging process using hydrothermally aged and non-hydrothermally aged starting materials.

A batch of ultrafine precipitated calcium carbonate (surface area 38 m$^2$/g) was divided into two portions, A and B. Portion A was aged by the method described in Example 1. Portion B was treated in a similar manner as portion A, as described in Example 1, up to and including the point were the sample was heated to 80° C. and NaOH was added. At this point, portion B was placed into a 4 liter PARR hydrothermal bomb where the temperature was raised to 200° C. The resulting pressure was 500 psi. Portion B was kept at these conditions for 1-1.5 hours at which point the material was quenched to room temperature to prevent further aging. FIG. 18 shows the comparison of the aging rates between 80° C. and 200° C. where it can be seen that a decrease in surface area occurs at a much faster rate when the starting material is hydrothermally-aged.

Figure 19:
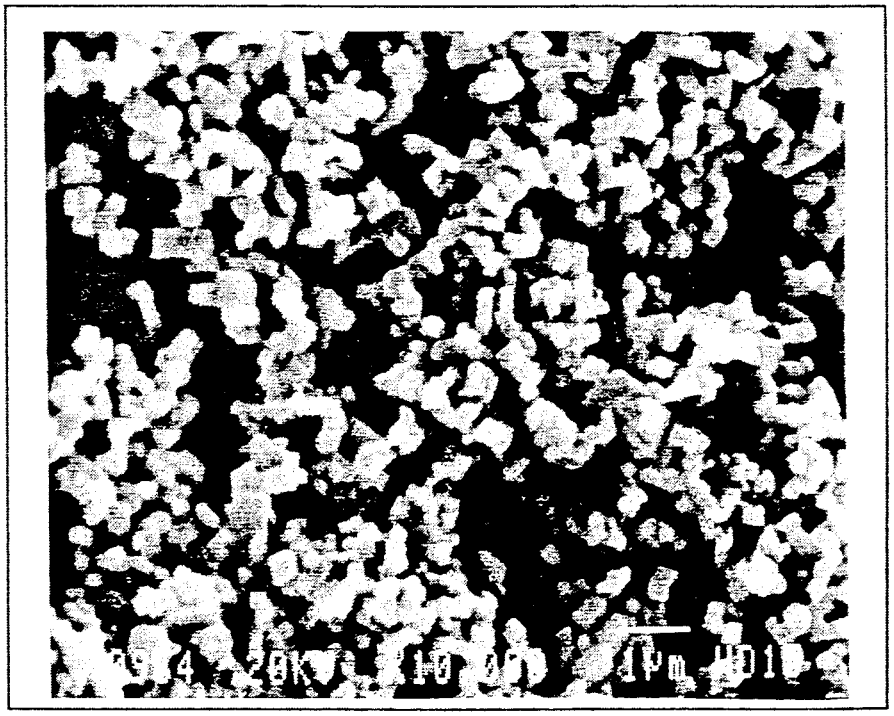
FIG. 19 is a photomicrograph of hydrothermally heat-aged ultrafine precipitated calcium carbonate showing the rhombohedral morphology.

The morphology of the hydrothermally-aged product is shown in FIG. 19.

We claim:

1. Calcium carbonate having a blocky rhombohedral calcite crystal structure and properties including a surface area of from about 3 to about 15 m$^2$/g, an average discrete particle size in the range of from about 0.2 to about 0.9 micron, a discrete particle aspect ratio of less than about 2:1, and a particle size distribution such that at least about 60 weight percent of the particles have a size within 50 percent of the equivalent discrete particle average spherical diameter.

2. Calcium carbonate having a blocky rhombohedral calcite crystal structure and properties including a surface area of from about 3 to about 15 m$^2$/g, an average discrete particle size in the range of from about 0.2 to about 0.9 micron, a discrete particle aspect ratio of less than about 2:1, and a particle size distribution such that at least about 60 weight percent of the particles have a size within 50 percent of the equivalent discrete particle average spherical diameter, produced from a feedstock having a substantially rhombohedral or spherical calcite crystal structure, and properties including a surface area greater than about 15 m$^2$/g and an average discrete particle size in the range of from about 0.01 to about 0.8 micron, according to a process comprising the steps of:

a) forming an aqueous slurry of the feedstock;
b) initiating heat-aging of the slurry by heating it to an aging temperature of from about 40° to about 100° C. at ambient pressure;
c) adjusting the pH of the slurry to about 6.5, at the aging temperature;
d) raising the pH of the slurry to from about 9.5 to about 12.0, at the aging temperature;
e) maintaining the slurry at the aging temperature for a time in the range of from about 1 to about 24 hours, said time being sufficient to cause the crystal structure and properties of the calcium carbonate feedstock to rearrange to the product form, said time within the range being determined by the nature of the calcium carbonate feedstock, and said time being such that it is less than the time required for a given calcium carbonate feedstock to rearrange to the product form by Ostwald ripening; and
f) terminating heat aging to fix the crystal structure and properties of the calcium carbonate in the product form.

3. Calcium carbonate having a blocky rhombohedral calcite crystal structure and properties including a surface area of from about 3 to about 15 m$^2$/g, an average discrete particle size in the range of from about 0.2 to about 0.9 micron, a discrete particle aspect ratio of less than about 2:1, and a particle size distribution such that at least about 60 weight percent of the particles have a size within 50 percent of the equivalent discrete particle average spherical diameter, produced from a feedstock having a substantially rhombohedral or spherical calcite crystal structure, and properties including a surface area greater than about 15 m$^2$/g and an average discrete particle size in the range of from about 0.01 to about 0.8 micron, according to a process comprising the steps of:

a) forming an aqueous slurry of the feedstock;
b) initiating heat-aging of the slurry by heating it to an aging temperature of from about 40° to about 100° C. at ambient pressure;
c) adjusting the pH of the slurry to about 6.5, at the aging temperature;
d) raising the pH of the slurry to from about 9.5 to about 12.0, at the aging temperature;
e) placing the slurry in a hydrothermal bomb;
f) sealing said bomb;
g) raising the temperature in said bomb to a hydrothermal aging temperature of the slurry of up to about 300° C., to initiate hydrothermal heat-aging;
h) maintaining the slurry in the hydrothermal bomb at the hydrothermal aging temperature and at the resultant bomb pressure for a time in the range of from about 1 to about 24 hours, said time being sufficient to cause the crystal structure and properties of the calcium carbonate to rearrange to the product form, said time within the range being determined by the nature of the calcium carbonate feedstock, and said time being such that it is less than the time required for a given calcium carbonate feedstock to rearrange to the product form by Ostwald ripening; and
i) terminating hydrothermal heat aging by rapidly lowering the bomb pressure and temperature to fix the crystal structure and properties of the calcium carbonate in the product form.

4. Calcium carbonate having a blocky rhombohedral calcite crystal structure and properties including a surface area of from about 3 to about 15 m$^2$/g, an average discrete particle size of from about 0.2 to about 0.9 micron, a discrete particle aspect ratio of less than about 2:1, and a particle size distribution such that at least about 60 weight percent of the particles have a size within 50 percent of the equivalent discrete particle average spherical diameter, produced from a feedstock having a substantially rhombohedral or spherical calcite structure, and properties including a surface area greater than about 15 m$^2$/g and an average discrete particle size of from about 0.01 to about 0.8 micron, according to a process comprising the steps of:

a) forming an aqueous slurry of the feedstock;
b) placing the slurry in a hydrothermal bomb;
c) sealing said bomb;

d) raising the temperature in the bomb to a hydrothermal aging temperature of the slurry of up to about 300° C., to initiate hydrothermal heat aging;

e) maintaining the slurry in the hydrothermal bomb at the hydrothermal aging temperature and at the resultant bomb pressure for a time in the range of from about 1 to about 24 hours, said time being sufficient to cause the crystal structure and properties of the calcium carbonate feedstock to rearrange to the product form, said time within the range being determined by the nature of the calcium carbonate feedstock, and said time being such that it is less than the time required for a given calcium carbonate feedstock to rearrange to the product form by Ostwald ripening; and f) terminating hydrothermal heat aging by rapidly lowering the bomb pressure and temperature to fix the crystal structure and properties of the calcium carbonate in the product form.

* * * * *